United States Patent
Azevedo et al.

(10) Patent No.: US 6,519,666 B1
(45) Date of Patent: Feb. 11, 2003

(54) ARBITRATION SCHEME FOR OPTIMAL PERFORMANCE

(75) Inventors: Michael Joseph Azevedo, San Jose, CA (US); Carol Spanel, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/412,990

(22) Filed: Oct. 5, 1999

(51) Int. Cl.[7] ............................................. G06F 13/368
(52) U.S. Cl. ........................ 710/120; 710/243; 710/309
(58) Field of Search .................................. 710/113, 111, 710/116, 120, 243, 244, 123, 240, 309

(56) References Cited

U.S. PATENT DOCUMENTS

| | | | |
|---|---|---|---|
| 4,314,335 A | * 2/1982 | Pezzi ......................... 364/200 |
| 4,458,314 A | 7/1984 | Grimes |
| 4,719,569 A | 1/1988 | Ludemann et al. |
| 4,763,323 A | 8/1988 | Nelson et al. |
| 4,987,529 A | 1/1991 | Craft et al. |
| 5,195,185 A | 3/1993 | Marenin |
| 5,237,568 A | 8/1993 | Woest et al. |
| 5,293,621 A | 3/1994 | White et al. |
| 5,353,417 A | * 10/1994 | Iuco et al. ................... 395/325 |
| 5,416,910 A | 5/1995 | Moyer et al. |
| 5,438,666 A | 8/1995 | Craft et al. |
| 5,463,740 A | * 10/1995 | Taniai et al. ................ 395/633 |
| 5,467,295 A | 11/1995 | Young et al. |
| 5,608,881 A | * 3/1997 | Masummura et al. ....... 395/306 |
| 5,619,661 A | * 4/1997 | Crews et al. ................ 395/299 |
| 5,619,726 A | * 4/1997 | Seconi et al. ............... 395/842 |
| 5,696,976 A | 12/1997 | Nizar et al. |
| 5,768,548 A | 6/1998 | Young et al. |
| 5,768,622 A | 6/1998 | Lory et al. |
| 5,784,582 A | 7/1998 | Hughes |
| 5,797,020 A | 8/1998 | Bonella et al. |
| 5,983,302 A | * 11/1999 | Christiansen et al. ....... 710/113 |
| 6,119,196 A | * 9/2000 | Muller et al. ............... 710/243 |

* cited by examiner

Primary Examiner—Rupal Dharia
Assistant Examiner—X. Chung Trans
(74) Attorney, Agent, or Firm—Oppenheimer Wolff & Donnelly

(57) ABSTRACT

A shared bus arbitration scheme for a data communication system is provided, where a shared bus is connected to a plurality of bus masters and resources, some resources having higher priority than the others and including a peripheral device. Each master may request control of the shared bus and is adapted to perform short transfers and long burst transfers on the shared bus between a resource and the master. A shared bus arbiter is utilized for dynamically determining the highest priority request between a number of shared bus requests, and granting control of the shared bus to the highest priority requesting bus master. The arbiter utilizes a three-level priority hierarchy arbitration scheme where the highest priority level is given to short message transfer requests on the higher-priority system resources, the intermediate priority level is given to short message transfer requests on the lower-priority system resources, if there are no outstanding higher priority level requests, and the lowest priority level is given for long burst transfers, if there are no outstanding short message transfer requests.

36 Claims, 4 Drawing Sheets

ARBITRATION SCHEME FOR OPTIMAL PERFORMANCE

BACKGROUND OF THE INVENTION

1. Field of the Invention

This invention relates in general to data communication systems, and in particular to high performance data communication systems having an optimized multi-master shared bus arbitration scheme.

2. Description of Related Art

Digital communication over a communication channel is well known in the art. Modern data communication systems often have multiple high performance data processors and generally include a plurality of external devices interconnected by one or more various buses. For example, modern computer systems typically include a host processor coupled through a high bandwidth local expansion bus, such as the peripheral component interconnect (PCI) bus or the VESA (Video Electronics Standard Association) VL bus, to an external shared memory, peripheral devices, and other processors. Examples of devices which can be coupled to local expansion buses include SCSI adapters, network interface cards, video adapters, etc.

High performance bus architectures, such as the PCI bus architecture, provide a hardware mechanism for transferring large sequential groups of data between a peripheral controller's local memory and a host processor's shared memory via burst cycles. In many bus architectures, the maximum burst length is typically not defined.

Systems in which many devices share a common resource typically utilize arrangements for allocating access to the resource under conditions during which a plurality of associated devices may concurrently request access. High performance systems have the potential to generate multiple independent requests for access to one or more external components, often via a single shared bus interface unit (BIU). Since multiple independent input/output (I/O) requests may appear at the BIU at any given time, the data communication system requires a shared bus arbitration scheme to determine the priority of the I/O requests for accessing the shared bus. In multi-master systems, where one or more data processors have the capability of becoming a bus master, the bus arbitration protocol determines which data processor becomes the bus master first. Typically, these multi-master systems employ an arbiter, external to the data processors, to control the shared bus arbitration, and each data processor requests access to an external shared memory or another external device from the arbiter.

Elaborate fairness algorithms have been devised that relieve the symptoms of hogging of the shared bus. Generally, multi-master systems depend on some sort of fairness arbitration protocol to prevent any one bus master from monopolizing the shared bus. A common arbitration scheme is least-recently-used (LRU) master scheme. A typical fairness protocol would limit each bus master to only one bus transaction, when the arbiter receives requests from multiple potential bus masters. Essentially, the arbiter would allow each master a turn in round-robin fashion. Automatic rotation of priorities when the interrupting devices are of equal priority is usually accomplished by rotating (circular shifting) the assigned priorities so that the most recently served device is assigned the lowest priority. In this way, accessibility to the shared resource tends to be statistically leveled for each of the competing devices.

Historically, arbitration devices have allocated access using a variety of predetermined hierarchies of priority. For example, some arbiters utilize a system in which access is a direct function of the order in which the requests are received from the external devices. Other systems incorporate priority levels for access, and each external device is assigned a particular priority value. Generally, existing arbitration schemes attempt to achieve a level of fairness appropriate to the particular system architecture, which insures that no one external device may dominate the resource, such as a shared bus, and thereby starve other external devices having lower priority levels.

For systems having lower performance objectives, a conventional priority scheme, such as round-robin scheme, might provide sufficient performance. However, high performance multi-master data communication systems, where various shared bus masters transfer long continuous burst transfers, as well as short burst messages, and perform register access transactions, require optimized performance, and need an improved arbiter priority algorithm. Usually, in such systems, the short message traffic on the bus should not be excessively delayed due to the long burst transfer activity.

Therefore, there is a need for an improved priority algorithm, in high performance multi-master data communication systems with multiple shared external devices, to insure that the system cannot lock the shared bus resource, and that the short burst messages and register access transactions on the shared bus are effectively processed between the long burst transfers.

SUMMARY OF THE INVENTION

The foregoing and other objects, features, and advantages of the present invention will be apparent from the following detailed description of the preferred embodiments which makes reference to several drawing figures.

One preferred embodiment of the present invention includes a shared bus master arbitration circuitry, utilized in a data communication system, for allocating access to a shared bus connected to a plurality of data processing devices and resources, where the shared bus is located between a higher-priority system resource, a lower-priority system resource, and a peripheral device. The system utilizes a shared bus arbiter for dynamically determining the highest priority request between a number of shared bus requests and granting control of the shared bus to the highest priority request.

Another preferred embodiment of the present invention includes a shared bus arbitration scheme for a data communication system, where a shared bus is connected to a plurality of bus masters and resources, some resources having higher priority than the others and including a peripheral device. Each master may request control of the shared bus and is adapted to perform short transfers and long burst transfers on the shared bus between a resource and the master. A shared bus arbiter is utilized for dynamically determining the highest priority request between a number of shared bus requests, and granting control of the shared bus to the highest priority requesting bus master.

In all the embodiments of the present invention the arbiter utilizes a three-level priority hierarchy arbitration scheme where the highest priority level is given to short message transfer requests on the higher-priority system resources, the intermediate priority level is given to short message transfer requests on the lower-priority system resources, if there are no outstanding higher priority level requests, and the lowest priority level is given for long burst transfers, if there are no outstanding short message transfer requests. The short message transfers include short burst transfers and register access transactions. If there are simultaneously several requests with the same priority level, the same-priority level requests are serviced in the next arbitration cycle in round robin fashion.

The bus arbiter postpones the lower level requests for a pre-determined delay period, for allowing all higher level operations queued by the same requester to execute before the shared bus control is given to any lower priority requester, and for preventing a lower priority level transaction from intervening between consecutive higher priority level transactions from the same requester. The pre-determined delay period is about one clock cycle greater than the maximum time required for the same requester to re-assert its shared bus request for the next short message transfer. The higher-priority system resource includes at least one component from a processor-shared memory subsystem connected to the shared bus via an external or internal bus, and the lower-priority system resource is selected from a plurality of interfaced system components, including controller processors and peripheral devices.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention discloses a shared bus arbitration scheme and apparatus for optimizing the management of data within a shared bus with multiple masters having a buffering capability. In the following description numerous details, such as specific memory sizes, bandwidths, data paths, etc., are avoided because it is apparent to one skilled in the art that these specific details are not essential to the practice of the present invention. In particular, the present invention can readily be used in conjunction with a wide variety of data communication system components and bus types, each bus having its own unique protocol, bandwidth, and data transfer characteristics. It is further noted that well known electrical structures and circuits are shown in block diagram form, in a number of figures, in order not to obscure the present invention unnecessarily.

As will be described, the preferred embodiments of the present invention utilize an improved arbiter priority algorithm for high performance multi-master data communication systems, where various shared bus masters request long continuous burst transfers as well as short message transfers and register access transactions, and in which the short message transactions are not being excessively delayed due to the long burst transfer activity. According to this priority algorithm the processors dispatching messages via shared bus masters requiring short burst transfer and register-to-register transfer can quickly perform, thus freeing the processors to proceed with other tasks within the system, such as task management. The configuration minimizes the amount of time that data from a particular source must wait to be read to and written, and thus minimizes latency. It also permits the priorities of the masters to be changed dynamically.

Figure 1:
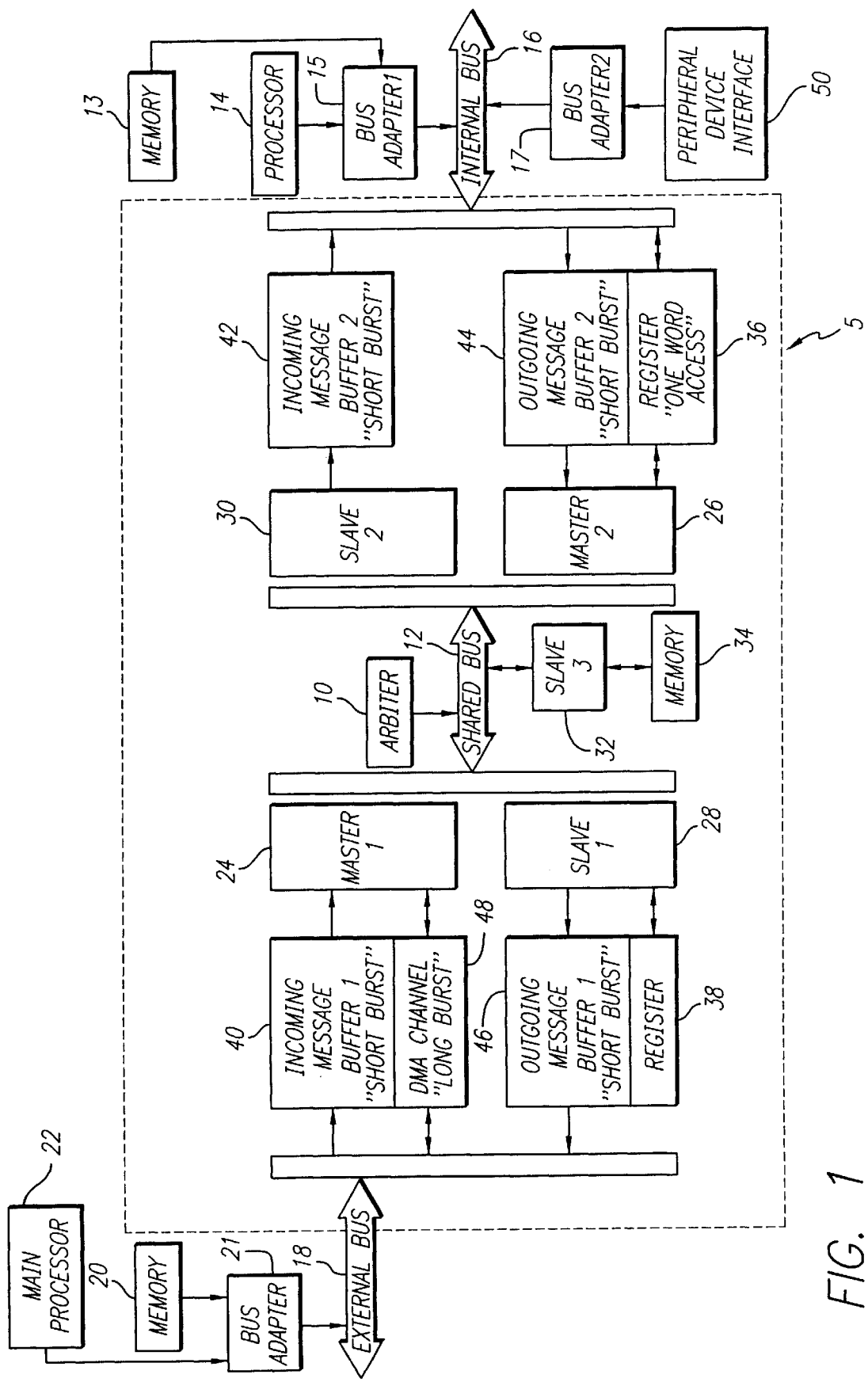
FIG. 1 illustrates a block diagram of an exemplary data communication system incorporating a bus arbitration circuit of the present invention.

FIG. 1 illustrates, in a form of a block diagram, an exemplary embodiment of the present invention of a data communication system incorporating a host adapter circuit 5, used between a host processor 22 with an external central shared memory 20, and an external peripheral device interface 50. The external peripheral device interface 50 is connected to the internal bus 16, via bus adapter2 17, and is controlled by processor 14, having an associated instruction and data memory 13. This architecture may be used as an adapter or a bridge between the host processor 22 and the peripheral device interface 50, and includes logic, according to the present invention, which allows data transfers between the peripheral devices, not shown, and the central shared memory 20.

As shown in FIG. 1, the processor 14 is connected to the host adapter circuitry 5 via a bus adapter 15 and a peripheral internal bus 16, and is used to support the high level management of the interface 50 I/O operations. The host processor 22 and its associated central shared memory 20 are connected to the host adapter circuit 5 via a bus adapter 21 and a high performance external bus 18. In the preferred embodiment of the present invention, the host adapter circuit 5 acts as a bridge between the internal bus 16 and the external bus 18, and utilizes a single shared bus 12, controlled by multiple bus masters, defined below. In this system a bus arbiter 10 is utilized to decide the shared bus 12 ownership.

The primary task of the bridge, such as the host adapter 5 of the present invention, is to allow data to cross from one bus to the other bus without diminishing the performance of either bus. To perform this function, the bridge must understand and participate in the bus protocol of each of the buses. In particular, the bridge must be able to serve in both a slave capacity and a master capacity so that it can accept a request from a first bus as a slave, then initiate an appropriate bus operation on the other bus as a master. The bridge must, therefore, provide support for accesses crossing from one bus to the other.

In the present invention the external bus 18 and internal bus 16 are preferably of a peripheral component interconnect (PCI) bus type. The system central shared memory 20 is preferably a cache memory. It may be a Synchronous Dynamic Random Access Memory (SDRAM), which is a high performance memory structure with clocked or pipelined interface. The peripheral device interface 50 is preferably used with ESCON interface. It also may be the small computer systems interface (SCSI) interface or Fibre Channel interface. However, it is noted that the present invention may be incorporated into any of various types of systems including various types of buses, and other system and peripheral components, as desired. For example, instead of the PCI local bus, it is noted that other local buses may be used, such as the VME bus.

The PCI bus was designed to have a high throughput and to take advantage of the increasing number of local processors that support host I/O functions. For example, most disk controllers, particularly SCSI controllers, and network interface cards (NICs) include a local processor to relieve demands on the host processor. Typically these devices have the capability of operating as bus masters, to allow them to transfer data at the highest possible rates.

In the high performance data communication system of FIG. 1 the host adapter circuit 5 acts as a PCI bus interface supporting the processor 14, acting as an ESCON or SCSI controller, and operating as the PCI bus 18 master, to perform transfers on the PCI bus 18. The publication PCI System Architecture by Tom Shanley and Don Anderson, available from Mindshare Press, 2202 Buttercup Dr., Richardson, Tex. 75082 (214) 231-2216, is hereby incorporated by reference in its entirety. For more details on the PCI bus, reference to the PCI Standard Version 2.1, from the PCI Special Interest Group in care of Intel Corp., which is hereby incorporated by reference, is advised.

The host adapter 5 of FIG. 1 includes logic that may interface to various peripherals, which may include DMA channels, memory, interrupt system timers, a real time clock (RTC), configuration ports, diagnostic ports, command/status registers (all not shown).

The exemplary embodiment of FIG. 1 includes several master and slave hardware circuits, such as Master1 24, Master2 26, Slave1 28, Slave2 30 and Slave3 32, all preferably implemented in a single ASIC, without any internal processor circuitry. Master1 24 is connected to and communicates with the Slave2 30 and Master2 26 is connected to the Slave1 28. Slave3 32 is connected to a local memory 34, used for the interface 50. In this architecture, only the Master1 24 supports long burst direct memory access (DMA) transfers between the local memory 34 and the central memory 20, via the external bus 18. Therefore, in this architecture all slaves 28, 30, 32 and the Master2 26 are non-streaming devices. The DMA transfers are initiated by the host adapter circuit 5, which also provides a DMA channel and buffering for these long burst transfers. Long burst transfers include voluminous data and a request command for the DMA transfer is saved within a DMA request queue within a DMA channel long burst buffer 48, connected to the Master1 24.

In this architecture, short burst transfers occur between the external bus 18 and the internal bus 16 and preferably move between one and eight words between the processor 14 and the host processor 22. If the external bus 18 and internal bus 16 are PCI buses, short burst read and write transfers are accomplished according to the PCI protocol, and transfers can be initiated by the either bus.

Short burst transfer requests contain both the request command and message data such as I/O addresses. When received from the external bus 18, data is queued into an incoming short burst message buffer1 40 of Master1 24. After the shared bus 12 control is acquired, data is transferred via the shared bus 12 into an incoming short burst message buffer2 42 of the Slave2 30. Short burst transfer data received from the internal bus 16 is received into an outgoing short burst message buffer2 44 of Master2 26, and afterwards transferred via the shared bus 12 into an outgoing short burst message buffer1 46 of the Slave1 28.

In the exemplary embodiment shown in FIG. 1, Master 24 supports only short burst transfers and long burst transfers. Master2 26 does not support long burst transfers but supports short burst transfers as well as one word register access transactions from Master2 registers 36 to Slave1 registers 38, requested by the processor 14. In this architecture Master1 24 and Master2 26 short burst write transfer requests are saved in a multiple-entry write queue and read transfer requests only need a one-entry read queue, because the system has to wait for the data to be read and does not save multiple read requests.

In this architecture there is a desire to keep the Master 2 queue empty, so as not to stop processes inside the processor 14. Similarly, there is a desire to keep the Master1 24 queue empty so as not to stop processes inside the processor 22. However, if a conventional priority scheme is utilized in the busy system of FIG. 1, a shared bus 12 master, such as the Master2 26, which is trying to send a short burst message, or perform a register access transaction, such as reading a status register, could be caused to wait for a long period of time, due to a series of long burst transfers.

Severe performance degradation may occur due to the heavy long burst traffic from the Master1 24 to Slave3 32, if the queues, including Master2 26 short burst message buffer2 44 queue, are allowed to fill up and stop execution of the processor 14 initiating this operation, thus preventing the processor 14 from performing other necessary control functions. Other hang conditions of the shared bus 12 may occur when a bus master, such as Master2 26, obtains the shared bus 12 to send a short burst request to write data, and there is no buffer space available in the outgoing short burst message buffer1 46 at Slave1 28. In this case, the shared bus 12 will be locked to Master2 26 until the buffer1 46 is emptied enough to allow the short burst transfer to complete. Moreover, under some circumstances where another master (e.g. Master1 24) also has an incoming message from the external bus 18, destined to Slave2 30, and there is no available buffer space in the incoming short burst message buffer1 40 of Master1 24, a full bus deadlock may occur, thus preventing either the Master1 24 or Master2 26 from completing its operation.

The arbitration scheme of the present invention provides a solution for these problems. According to the preferred embodiment of the present invention, corresponding to the example of FIG. 1, the arbiter 10 for the shared bus 12 is structured to have three priority levels. The highest priority, Level 1 priority, is given to the Master1 24 short burst transfers, because these operations complete quickly and would otherwise stall the critical external bus 18 resources, if not allowed to complete. If there is no space available in output Slave2 buffer 42, the arbiter 10 remains reserved in Level 1 waiting for the space available condition.

Next in priority is Level 2, which is assigned to the Master2 26 for short burst transfers. Grant of the Level 2 priority is conditioned on the outgoing short burst message buffer1 46 of the Slave1 28 having enough space available to hold a maximum length short burst message from the Master2 26. If there is no space available, the arbiter 10 remains reserved in Level 2 waiting for the space available condition, unless preempted by the shared bus request of Level 1. Thus, the priority scheme of the present invention prevents the Master2 26 from starting a short burst transfer and hanging the shared bus 12 part way through the short burst transfer, due to no space available in the outgoing short burst message buffer1 46 of the Slave1 28. If the arbiter 10 were to allow the Master2 26 to claim ownership of the shared bus 12, without guaranteeing the sufficient room in the outgoing short burst message buffer1 46 of the Slave1 28, the system could experience a full deadlock condition due to the shared bus 12 being indefinitely locked to the Master2 26 transfer.

In this architecture a full deadlock occurs when a resource on the external bus 18 is trying to send a message targeted to the incoming short burst message buffer1 40, when this buffer is full, and the outgoing short burst message buffer1 46 is full trying to send a message for the same resource on the external bus 18, and the buffers in its path are also full. Since neither side will yield the common resources to allow its incoming operation to complete and allow its filled buffers to empty, the entire system stalls. The preferred embodiment of the present invention Level 2 priority scheme prevents this potential deadlock.

When there are no requests for a Level 1 or Level 2 transfer, the Master1 24 long burst request between the external bus 18 and the Slave3 32 will be serviced at the lowest priority, Level 3.

Thus, the arbiter 10 allows all short burst messages and register access requests, queued for Master2 26 by the processor 14, or short burst messages by the Master1 24, to execute before granting the shared bus 12 for a long burst transfer from the Master1 24. If the short burst messages from the Master2 26 have to wait behind multiple long burst transfers from the Master1 24, it is possible for processor 14 dispatching messages to stall due to the outgoing short burst message buffer2 44 becoming full, thus degrading system performance.

However, even though the Master2 26 has a higher priority than the long burst transfers from the Master1 24, between its short burst transfers it is forced to de-assert its shared bus 12 transfer request and re-assert it. During the time that Master2 26 de-asserts its shared bus 12 request, a long burst transfer is capable of winning the arbitration. In that case only one Master2 26 short burst transfer would execute between any Master1 24 long burst transfers.

To solve this problem the arbiter 10 postpones the Level 3 requests for a delay period, following a Level 1 or Level 2 shared bus 12 ownership cycle, to allow all short burst transfers which are queued to be granted the shared bus 12 access, before the long burst activity can resume. The delay period is also introduced to Level 2 requests, to prevent a Level 2 request performing before an outstanding Level 1 request. This delay period must be carefully selected. For example, it is preferably about one clock cycle greater than the maximum time required for the same master to re-assert its shared bus 12 request for the next short burst transfer stacked in the queue. Any value much greater than this will degrade the overall shared bus 12 performance.

Figure 2:
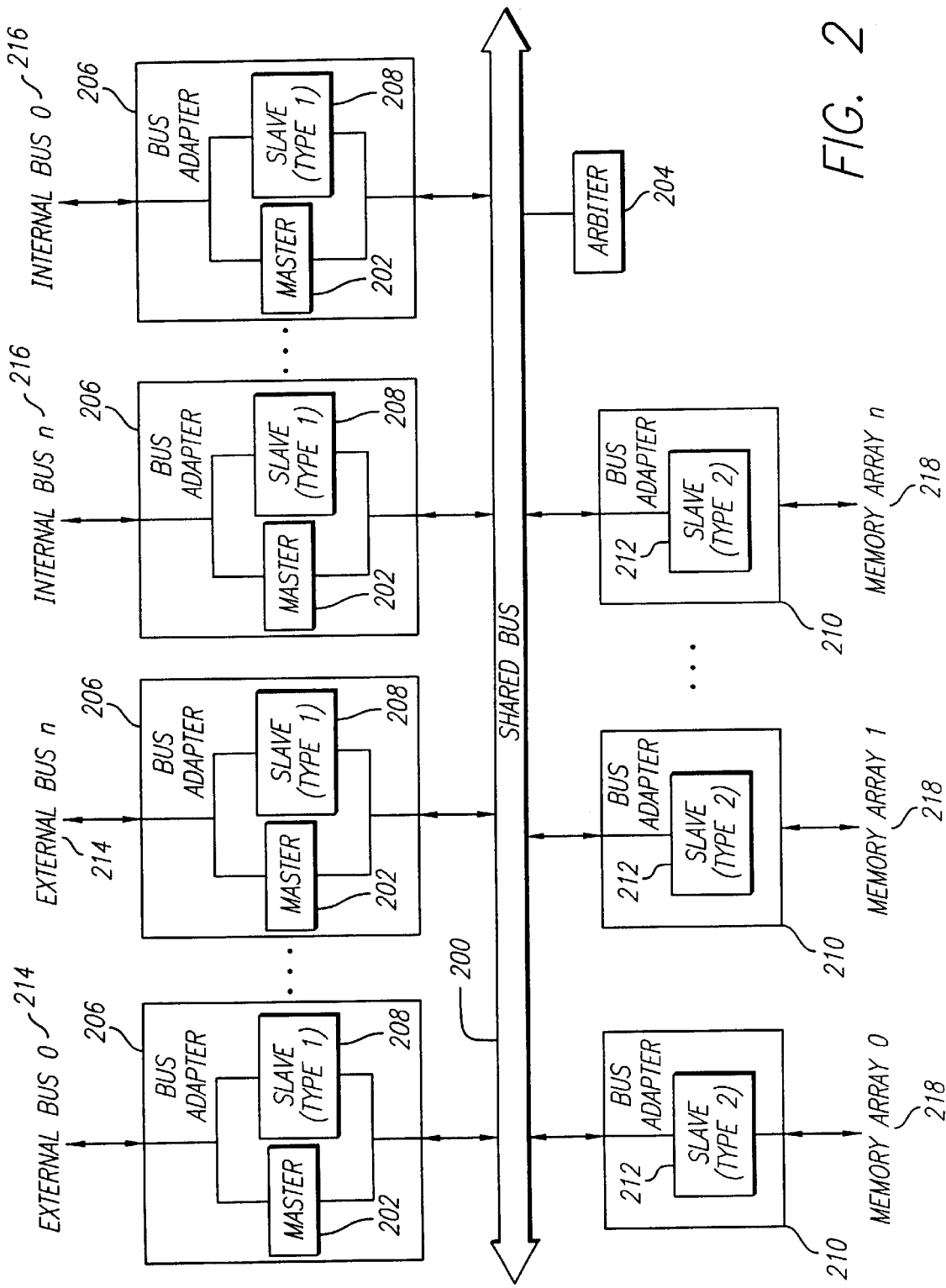
FIG. 2 illustrates a block diagram of a generalized embodiment of the present invention, presenting a data communication intermediate circuit, such as a bus master arbitration circuitry.

FIG. 2 illustrates another, generalized embodiment of the present invention, presenting a data communication intermediate circuit, such as a bus master arbitration circuitry, and a method for improved management of data flow from a processor-shared memory subsystem to a plurality of interfaced system components. This circuitry includes a central arbiter 204 to a shared bus 200, configured to control the order in which access to the shared bus 200 is granted. In the general environment of the present invention the bus master arbitration circuitry utilizes an improved prioritization scheme which allows the arbiter 204 to control access to the shared bus 200 via bus masters and bus slaves of bus adapters 206, 210.

System components may concurrently request access to the central arbiter 204 control logic in 15 order to acquire a path through which a processor of the processor-shared memory subsystem, not shown, may directly access a peripheral component device mapped anywhere in the system memory or I/O address space. Peripheral components are preferably coupled to the shared bus 200. The bus arbiter 204 is connected to a plurality of bus master and bus slaves, wherein each master requests control of the central shared memory, a processor or a peripheral device, all not shown. The bus arbiter 204 grants control of the shared bus 200 to the bus master with the highest level priority request.

In this embodiment, the bus master arbitration circuitry minimizes the amount of time data from a particular source must wait to be read to or written from, thus minimizing latency, transferring data in greater volumes and at higher speeds. Preferably, the arbiter 204 utilizes a three-level priority hierarchy, in the case of simultaneous requests, to provide quicker or enhanced access to those system components or transfer requests which can be completed in less amount of time or which can free the important system resources. Arbiter 204 considers the location, size and direction of the transfer to achieve its optimum arbitration decision.

Preferably the central arbiter 204 is a single integrated circuit which includes control logic responsive to the characteristics of the requests currently pending to select a next request. It analyzes the queued requests from a plurality of data paths, and selects from the stored requests a next request for access, according to the embedded arbitration scheme, to control the order in which access is granted to a plurality of interfaced components.

The basic operation of the system embodiment having the architecture of FIG. 2 corresponds to the data flow through the host adapter 5, described in reference to FIG. 1. A variety of optimizations of this general embodiment of the present invention can be made according to a particular implementation or needs of a particular design. For systems employing the shared bus 200 structure with multiple bus masters 202, as shown in FIG. 2 embodiment, the centralized bus arbiter 204 is utilized to decide the shared bus 200 ownership. In high performance applications, where various masters can transfer long contiguous burst transfers, as well as short messages, some method of fairness must augment the standard priority algorithm to insure that the system cannot lock the shared bus resource and that short message transactions on this bus can be effectively processed between the long burst transfers.

FIG. 2 illustrates the multi-master system having a plurality of bus adapters. The first group consists of master/slave adapters 206, each of which consists of both a master 202 and a slave 208 circuit, associated with a shared resource elsewhere within the system. The second group consists of slave adapters 210, each of which only has a slave 212 circuit, affiliated with an unshared resource elsewhere in the system. In the embodiment of FIG. 2, some slaves 208 are connected to one of external buses 214 and the others are connected to one of internal buses 216.

The slave 208, connected to a shared resource via an external bus 214 or internal bus 216, may have to wait to process the transfer via that bus, until the respective external 18 or internal bus 16 resource becomes free. However, each slave 212 connected to an unshared resource, shown in this example in conjunction with an unshared memory array 218, is characterized as always being capable of transferring data with minimal (if any) waiting, because it is directly attached to an unshared resource, only dedicated to this slave 212. Each master 202 capable of performing long burst DMA operations is assumed to have sufficient internal buffering for the full long burst read operations. If this is not the case, the DMA Master 202 relinquishes ownership of the shared bus 200, when its internal buffer becomes full.

In this embodiment, only the bus adapters 206 having a master 202 element can initiate transactions on the shared bus 200. Each bus master 202 is instructed to request the transfer on the shared bus 200 by an initiator processor, not shown. One of a plurality of initiator processors is a host processor, connected with a central shared memory, and some processors may be peripheral device processors, such as the one used for an ESCON or SCSI controller, shown in the embodiment of FIG. 1. Each initiator processor is attached either to the external bus 214 or the internal bus 216.

Each bus master 202 can be instructed to request the shared bus 200 in one of two ways. In the first method, an initiator processor on an external bus 214 or internal bus 216 wishes to write/read a short message to/from a target component, such as the central shared memory or another processor, on another internal bus 216 or external bus 214, or from/to one of the memory arrays 218. In the second method, a DMA channel within the master 202 circuit is instructed by the initiator processor to perform a long burst transaction (either write or read) between its associated internal bus 216 or external bus 214 and one of the slaves 212, for example, to transfer data between the central shared memory and one of the memory arrays 218.

Short messages may be short burst operations or register access transactions, as described previously in regard to FIG. 1 embodiment. Short messages originate from an initiator processor on an external bus 214 or internal bus 216. The short burst messages are typically 4–32 bytes in length and could be either write or read operations. Register access transactions are usually a word long, where the word usually is four bytes in length, and are processed in the same way as short burst transactions, as described below, except that instead of using buffers, data is stored in master and slave registers of master/slave adapters 206.

If an initiator processor issues a short burst write request, target component address, request control data and message data for the transaction are queued into its bus adapter master 202 buffer, of one of the types shown in FIG. 1 embodiment. This master 202 then requests ownership of the shared bus 200 from the centralized arbiter 204 and when the request is granted, propagates the write request message to its target slave 208 or 212 and out to its associated internal bus 216, external bus 214 or memory array 218. For short burst write requests, as soon as the data and addresses for the operation are queued in the master 202 buffer, the initiator processor is freed and able to perform other useful work on behalf of other tasks within the system.

However, an initiator processor can become locked during a short burst write transaction if the master 202 buffer queue is full. To optimize the performance of the system, the arbitration algorithm of this embodiment must insure that an initiator processor on an external bus 214, which is a critical system resource, would not become locked due to a full buffer queue of its master 202. This requirement also exists for an initiator processor of an internal bus 216, but this bus has a lower priority than an external bus 214.

For short burst read requests, the address is queued in the appropriate master 202 buffer, and the initiator processor is locked to this transaction and cannot proceed until the data read for this request is returned by the bus master 202 to its initiator processor. Thus, short burst read requests tie up an important system resource. Therefore, although they are allowed, their use is strongly discouraged in the multi-processor shared bus system of this embodiment. Moreover, no additional requests can be added to a master 202 buffer queue, if that master 202 has a read request pending, until the short burst read transaction is completed and data is received back by the requesting initiator processor.

The slave 208 circuit, within the master/slave bus adapter 206, also has a buffer queue for short burst write or read operations, as shown in FIG. 1 embodiment. It is possible for this buffer queue to become full, due to a busy condition at its associated internal bus 216 or external bus 214. To optimize the performance, the master/slave bus arbiter 204 is designed to insure that, before a master 202 with a short burst request is granted ownership of the shared bus 200, there is sufficient space available in the target slave 208 buffer, to store the maximum length short burst message. If the bus arbiter 204 is allowed to grant the shared bus 200 ownership to a master 202 when there is insufficient space in the slave 208 buffer queue, the shared bus 200 becomes locked to this master 202 request until enough room becomes available in the corresponding slave 208 buffer queue to hold the entire short burst message. Therefore, this situation must be avoided, since it prevents any other master 202 from obtaining the shared bus 200 until the target slave 208 buffer is empty enough to allow the short burst transfer to complete.

As a general rule, in this embodiment of the present invention short burst requests are given higher priority arbitration status because the transactions, as the name implies, are of short duration and, as described earlier, it is important to clear the master 202 buffer queues by granting them shared bus 200 ownership whenever possible, to prevent stalling an initiator processor due to a master 202 buffer queue non-availability. Moreover, in this embodiment of the present invention, the short burst traffic must consume a small percentage of the total shared bus 200 bandwidth, relative to the long burst operations. Otherwise, the shared bus 200 would be heavily occupied with short burst messages so that long burst transactions would rarely get executed.

In this embodiment of the present invention, long burst transfers are preferably set up via an initiator processor which first sends a short burst message, describing the long burst transfer, to an appropriate master/slave bus adapter 206. This request may be composed of a series of short burst messages, which instruct a DMA channel within the master 202 circuit to move data between its respective internal bus 216 or external bus 214 and a slave 212 target, via the shared bus 200.

In each long burst read operation the bus master 202 initiates request for data transfer on its respective internal bus 216 or external bus 214, and buffers the received data. Further, it requests ownership of the shared bus 200 and, when the request is granted, sends data to the slave 212 target. In each long burst write operation the bus master 202 first requests ownership of the shared bus 200 and, when the request is granted, receives data from a slave 212 target into its buffers. Further, it initiates request for data transfer on its respective internal bus 216 or external bus 214 and sends data to that bus 216, 214.

According to this embodiment of the present invention the arbiter 204 for the shared bus 200 is structured to have three priority levels, in order to follow the rule that the arbiter 204 should grant bus ownership to the shared bus master 202 requesting long burst transfer only if there are no outstanding short burst requests from any bus master 202. The highest priority is Level 1, given to bus masters 202 connected to external bus 214 resources which have a request pending for a short message transaction, which may include a short burst transfer or register access transaction, and have sufficient space available in the target slave 208 buffer to accommodate the entire short burst message. However, in transfers to the slave 212, instead of the slave 208, since it is an unshared resource, there is no need to test for sufficient space.

When these conditions are asserted, the bus master 202 acquires a Level 1 request active status. This class of transactions is given the highest priority because the transfer size is small (i.e. operations complete quickly) and needed to allow the long burst to proceed, as well as to safeguard against an initiator processor connected on an external bus 214, which is the highest-priority system resource, getting stalled at a shared bus 200 transaction due to its bus master 202 buffer queue full condition. If there are simultaneously several masters 202 with Level 1 requests active, they are serviced in a round robin fashion, which means that the last shared bus 200 owner for a Level 1 operation will be serviced last in Level 1, the next time the shared bus 200 ownership is arbitrated. For example, in a system with four masters 202 capable of Level 1 operations (e.g., $M1_1$, $M1_2$, $M1_3$, $M1_4$), where $M1_2$ was the last owner of the shared bus 202 in a Level 1 transaction, the bus arbiter 204 will service active requests for Level 1 in the following order: $M1_3$, $M1_4$, $M1_1$, $M1_2$, in the next arbitration cycle.

In this embodiment of the present invention the arbitration priority is not allowed to drop to a lower level unless all Level 1 requests have been serviced. Therefore, when a given Level 1 master 202 has more than one short burst operation in its buffer queue and is the only requester for Level 1, in order to prevent the bus arbiter 204 to service a lower level request (Level 2 or Level 3) during the time the Level 1 master 202 de-asserts a request and re-asserts another request for the next Level 1 operation from the queue, the bus arbiter 204 postpones the lower level requests for a delay period, following the shared bus 200 ownership cycle, to allow all Level 1 operations queued on the same bus master 202 to execute before service is given to any lower priority requester. This delay period must be carefully selected. For example, it is preferably about one clock cycle greater than the maximum time required for the same master 202 to re-assert its bus request for the next short burst transfer stacked in its buffer queue. Any value much greater than this may degrade the overall shared bus 200 performance. Level 1 arbitration stays in effect as long as there exists a Level 1 request pending from any external bus 214 master 202.

In the absence of any Level 1 request pending, the next highest priority is Level 2, given to bus masters 202 connected to an internal bus resource 216, that have a Level 2 request pending for a short burst transaction and enough space available in the target slave 208 buffer to accommodate the entire short burst message. However, in transfers to the slave 212, instead of the slave 208, since it is an unshared resource, there is no need to test for sufficient space. The internal bus resource 216 is a lower-priority resource than the external bus 214. When these conditions exist, the master 202 has the Level 2 request active status. During the time a master 202 has a Level 2 request pending, the arbiter 204 can grant ownership to any Level 1 requester with the Level 1 request active status. If there are simultaneously several masters 202 with Level 2 requests active, they are serviced in a round robin fashion, same as the Level 1 requests. The delay period feature is also implemented for Level 2 requests, to prevent a Level 3 transaction from intervening between consecutive Level 2 transactions from a master. These consecutive Level 2 transactions may have been interlaced with Level 1 transfers.

If there are no Level 1 or Level 2 requests pending in the system, Level 3 priority requesters are serviced. Level 3 priority is given to a bus master 202 connected to an internal bus 216 or external bus 214, that is requesting a long burst transaction targeted to a slave 212 of a bus adapter 210.

Figure 3A:
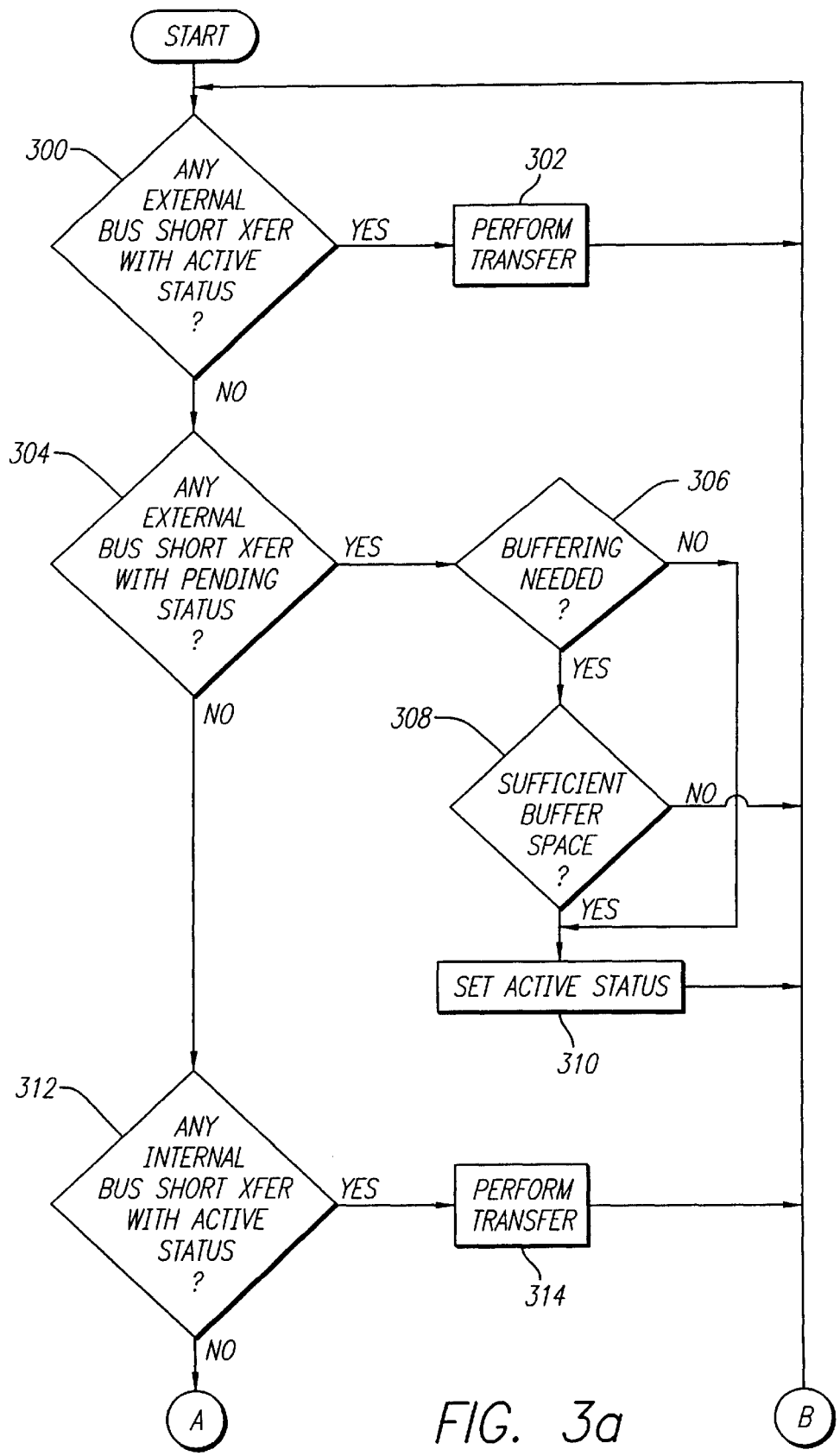
FIGS. 3a and 3b illustrate flowchart diagrams showing operations of a shared bus arbiter during bus transfers, according to the present invention.
Figure 3B:
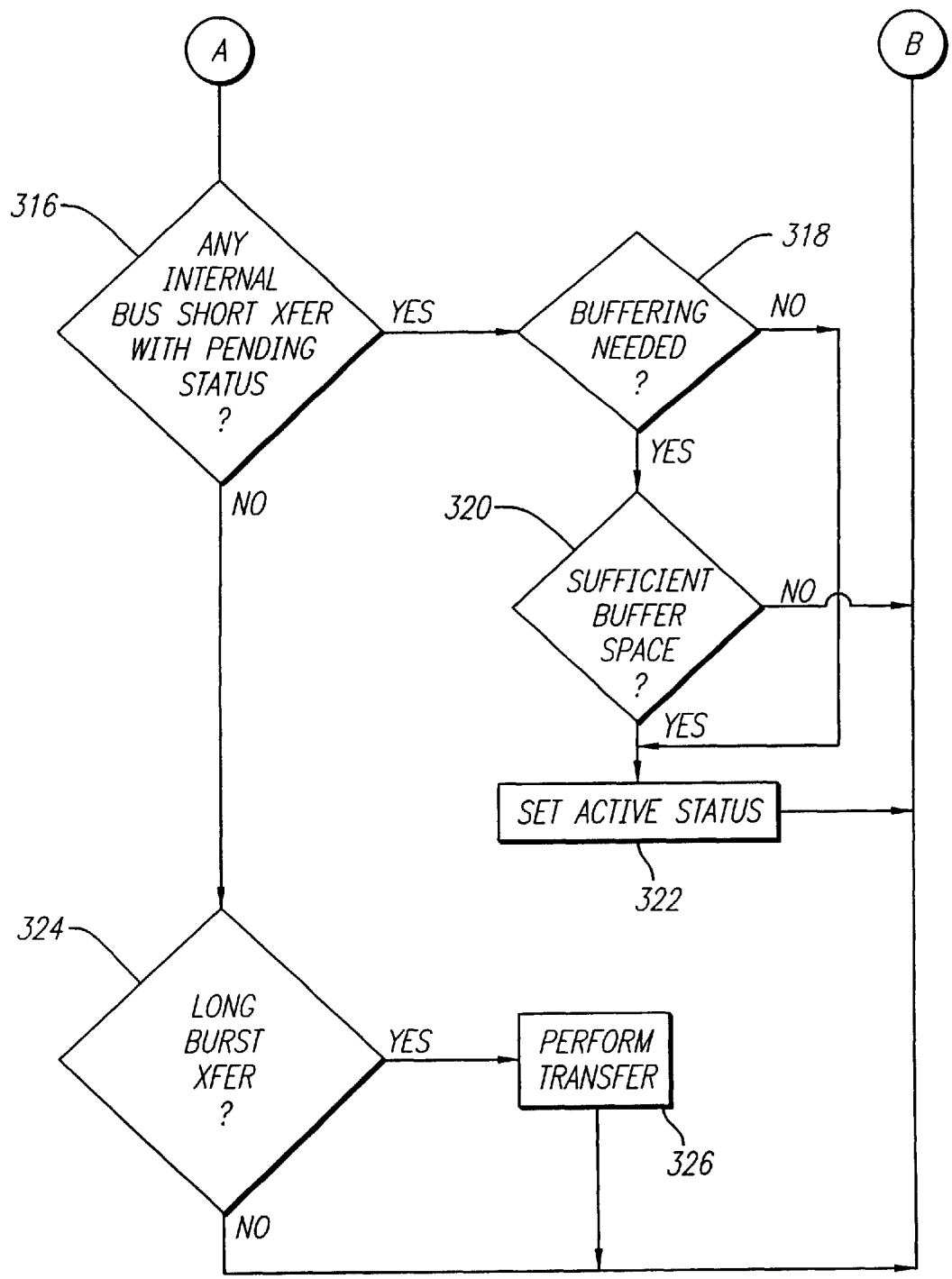

FIGS. 3a and 3b illustrate flowchart diagrams showing arbitration operations of the shared bus arbiter 204 during shared bus transfers, according to the generalized embodiment of the present invention. Block 300 represents the step of determining whether there are any outstanding short transfer requests involving the external bus 214, which have an active status. If found, the transfer is performed in block 302 and the bus arbiter dynamically selects another request with the highest priority level. If there are no outstanding short transfer requests involving the external bus 214 with active status, in block 304 it is checked whether there are such transfers with a pending status. If so, block 306 determines if buffering is needed. In such cases, block 308 determines whether there is sufficient buffer space. If so, the request status is set to active in block 310. The action is then returned to the beginning of the arbitration process.

If no outstanding short transfer requests involving the external bus 214 were found, block 312 represents the step of determining whether there are any outstanding short transfer requests involving the internal bus 216, which have an active status. If found, the transfer is performed in block 314 and the bus arbiter dynamically selects another request with the highest priority level. If there are no outstanding short transfer requests involving the internal bus 216 with active status, in block 316 it is checked whether there are such transfers with a pending status. If so, block 318 determines if buffering is needed. In such cases, block 320 determines whether there is sufficient buffer space. If so, the request status is set to active in block 322. The action is then returned to the beginning of the arbitration process.

If no short transfer requests were found, in block 324 it is determined whether there are any long burst transfers outstanding in the system. If so, the transfer is performed in block 326 and the action is then returned to the beginning of the arbitration process. The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A shared bus master arbitration circuitry, in a data communication system, for allocating access to a shared bus connected to a plurality of data processing devices and resources, wherein the shared bus is located between a higher-priority system resource, a lower-priority system resource, and a peripheral device, comprising:
   a shared bus arbiter for dynamically determining the highest priority request between a number of shared bus requests and granting control of the shared bus to the highest priority request; and wherein
   the arbiter utilizing a three-level priority hierarchy arbitration scheme,
   the highest priority level given to short message transfer requests on the higher-priority system resource,
   the intermediate priority level given to short message transfer requests on the lower-priority system resource, only if there are no outstanding higher priority level requests, and
   the lowest priority level given for long burst transfers, only if there are no outstanding short message transfer requests.

2. The apparatus according to claim 1, wherein the short message transfers including short burst transfers and/or register access transactions.

3. The apparatus according to claim 1, wherein, if there are simultaneously several requests with the same priority level, the same-priority level requests being serviced in the next arbitration cycle in round robin fashion.

4. The apparatus according to claim 1, wherein the bus arbiter postponing the lower level requests for a pre-determined delay period, for allowing all higher level operations queued by the same requester to execute before the shared bus control being given to any lower priority requester, and for preventing a lower priority level transaction from intervening between consecutive higher priority level transactions from the same requester.

5. The apparatus according to claim 4, wherein the pre-determined delay period being about one clock cycle greater than the maximum time required for the same requester to re-assert its shared bus request for the next short message transfer.

6. The apparatus according to claim 1, wherein the data communication system higher-priority system resource including at least one component from a processor-shared memory subsystem connected to the shared bus via an external or internal bus, and the lower-priority system resource selected from a plurality of interfaced system components, including controller processors and peripheral devices.

7. A data communication system comprising:
   a shared bus connected to a plurality of bus masters and resources, some resources having higher priority than the others and including a peripheral device, and wherein each master requesting control of the shared bus and being adapted to perform short transfers and long burst transfers on the shared bus between a resource and the master;
   a shared bus arbiter for dynamically determining the highest priority request between a number of shared bus requests and granting control of the shared bus to the highest priority requesting bus master; and wherein the arbiter utilizing a three-level priority hierarchy arbitration scheme,
      the highest priority level given to short message transfer requests on the higher-priority system resources,
      the intermediate priority level given to short message transfer requests on the lower-priority system resources, only if there are no outstanding higher priority level requests, and
      the lowest priority level given for long burst transfers, only if there are no outstanding short message transfer requests.

8. The system according to claim 7, wherein the higher-priority system resources including a shared system resource connected to the shared bus via an external bus, and the lower-priority system resources including a shared system resource connected to the shared bus via an internal bus.

9. The system according to claim 8, wherein said shared system resource selected from a group including a host processor, a controller processor and a shared memory.

10. The system according to claim 8, wherein said peripheral device connected to the shared bus and including a peripheral device local memory.

11. The system according to claim 8, wherein said highest priority level transfers and said intermediate priority level transfers being performed between one of said shared system resources on an external bus and another said shared system resource on an internal bus, or between one of said shared resources and the peripheral device.

12. The system according to claim 8, wherein said lowest priority level transfers being performed between one of said shared system resources and the peripheral device.

13. The system according to claim 8, wherein each said external bus and internal bus being a peripheral component interconnect (PCI) bus.

14. The system according to claim 7, wherein the short message transfers including short burst transfers and/or register access transactions.

15. The system according to claim 7, wherein, if there are simultaneously several requests with the same priority level, the same-priority level requests being serviced in the next arbitration cycle in round robin fashion.

16. The system according to claim 7, wherein the bus arbiter postponing the lower level requests for a pre-determined delay period, for allowing all higher level operations queued by the same requester to execute before the shared bus control being given to any lower priority requester, and for preventing a lower priority level transaction from intervening between consecutive higher priority level transactions from the same requester.

17. The system according to claim 16, wherein the pre-determined delay period being about one clock cycle greater than the maximum time required for the same requester to re-assert its shared bus request for the next short message transfer.

18. A method for optimizing arbitration across a shared bus connected to a plurality of data processing devices and resources, the shared bus located between higher-priority system resource, a lower-priority system resource, and a peripheral device, the method comprising the steps of:
   (a) dynamically determining the highest priority request between a number of shared bus requests utilizing a three-level priority hierarchy arbitration scheme, wherein
      the highest priority level given to short message transfer requests on the higher-priority system resource,
      the intermediate priority level given to short message transfer requests on the lower-priority system resource, only if there are no outstanding higher priority level requests, and
      the lowest priority level given for long burst transfers, only if there are no outstanding short message transfer requests;
   (b) granting control of the shared bus to the highest priority request; and
   (c) continually repeating the arbitration process for allowing any higher priority request to preempt a then currently designated highest priority request until the control of the shared bus is relinquished.

19. The method according to claim 18, wherein the short message transfers including short burst transfers and/or register access transactions.

20. The method according to claim 18, wherein, if several requests concurrently having the same priority level, the method further comprises a step of servicing the same-priority level requests in the next arbitration cycle in round robin fashion.

21. The method according to claim 18, further comprises a step of postponing the lower level requests for a predetermined delay period, for allowing all higher level operations queued by the same requester to execute before the shared bus control being given to any lower priority requester, and for preventing a lower priority level transaction from intervening between consecutive higher priority level transactions from the same requester.

22. The method according to claim 21, wherein the pre-determined delay period being about one clock cycle greater than the maximum time required for the same requester to re-assert its shared bus request for the next short message transfer.

23. The method according to claim 18, wherein the higher-priority system resource including at least one component from a processor-shared memory subsystem connected to the shared bus via an external or internal bus, and the lower-priority system resource selected from a plurality of interfaced system components, including controller processors and peripheral devices.

24. A method for optimizing arbitration across a shared bus connected to a plurality of bus masters and resources, some resources having higher priority than the others and including a peripheral device, and wherein each master requesting control of the shared bus and being adapted to perform short transfers and long burst transfers on the shared bus between a resource and the master, the method comprising the steps of:
- (a) dynamically determining the highest priority request between a number of shared bus requests utilizing a three-level priority hierarchy arbitration scheme, wherein
  - the highest priority level given to short message transfer requests on the higher-priority system resources,
  - the intermediate priority level given to short message transfer requests on the lower-priority system resources, only if there are no outstanding higher priority level requests, and
  - the lowest priority level given for long burst transfers, only if there are no outstanding short message transfer requests;
- (b) granting control of the shared bus to the highest priority request; and
- (c) continually repeating the arbitration process for allowing any higher priority request to preempt a then currently designated highest priority request until the control of the shared bus is relinquished.

25. The method according to claim 24, wherein the higher-priority system resources including a shared system resource connected to the shared bus via an external bus, and the lower-priority system resources including a shared system resource connected to the shared bus via an internal bus.

26. The method according to claim 25, wherein said shared system resource selected from a group including a host processor, a controller processor and a shared memory.

27. The method according to claim 25, wherein said peripheral device connected to the shared bus and including a peripheral device local memory.

28. The method according to claim 25, wherein said highest priority level transfers and said intermediate priority level transfers being performed between one of said shared system resources on an external bus and another said shared system resource on an internal bus, or between one of said shared resources and the peripheral device.

29. The method according to claim 28, wherein each said highest priority level transfer and said intermediate priority level transfer being performed between a master, connected to one of said shared system resources via an external bus, and a slave, connected to another said shared system resource via an internal bus, wherein the slave having a buffer, and wherein the step (b) of granting control of the shared bus to the highest priority request performed only if the slave buffer has sufficient space for accommodating the transfer.

30. The method according to claim 28, wherein each said highest priority level transfer and said intermediate priority level transfer being performed between a master, connected to one of said shared system resources via an internal bus, and a slave, connected to another said shared system resource via an external bus, wherein the slave having a buffer, and wherein the step (b) of granting control of the shared bus to the highest priority request performed only if the slave buffer has sufficient space for accommodating the transfer.

31. The method according to claim 25, wherein said lowest priority level transfers being performed between one of said shared system resources and the peripheral device.

32. The method according to claim 25, wherein each said external bus and internal bus being a peripheral component interconnect (PCI) bus.

33. The method according to claim 24, wherein the short message transfers including short burst transfers and/or register access transactions.

34. The method according to claim 24, wherein, if several requests concurrently having the same priority level, the method further comprises a step of servicing the same-priority level requests in the next arbitration cycle in round robin fashion.

35. The method according to claim 24, further comprises a step of postponing the lower level requests for a pre-determined delay period, for allowing all higher level operations queued by the same requester to execute before the shared bus control being given to any lower priority requester, and for preventing a lower priority level transaction from intervening between consecutive higher priority level transactions from the same requester.

36. The method according to claim 35, wherein the pre-determined delay period being about one clock cycle greater than the maximum time required for the same requester to re-assert its shared bus request for the next short message transfer.

* * * * *